No. 712,759. Patented Nov. 4, 1902.
C. M. BREEN.
TEST TRAP OR SEAL FOR SEWER PIPES.
(Application filed Aug. 13, 1901.)
(No Model.)
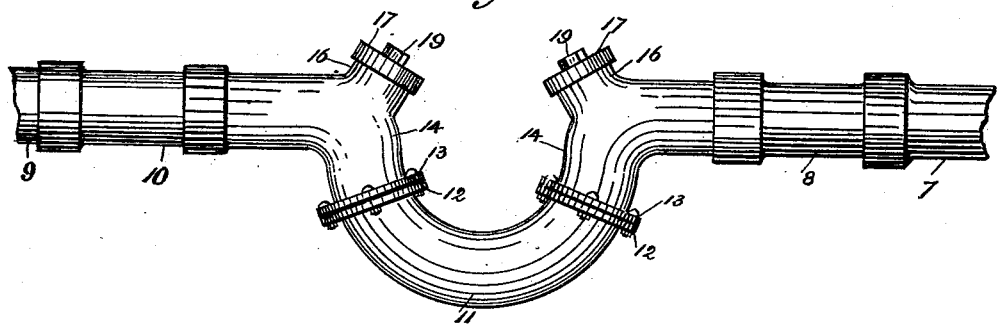
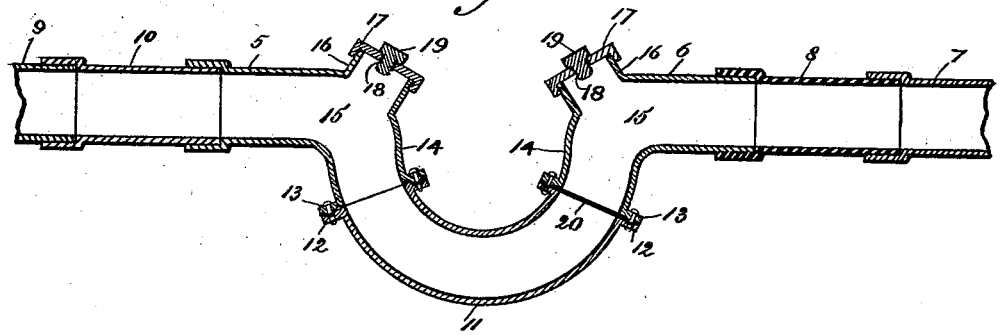

UNITED STATES PATENT OFFICE.

CORNELIUS M. BREEN, OF NEW YORK, N. Y., ASSIGNOR OF ONE-HALF TO WILLIAM F. PRENDERGAST, OF NEW YORK, N. Y.

TEST TRAP OR SEAL FOR SEWER-PIPES.

SPECIFICATION forming part of Letters Patent No. 712,759, dated November 4, 1902.

Application filed August 13, 1901. Serial No. 71,893. (No model.)

*To all whom it may concern:*

Be it known that I, CORNELIUS M. BREEN, a citizen of the United States, residing at New York, in the county of New York and State of New York, have invented certain new and useful Improvements in Test Traps or Seals for Sewer-Pipes, of which the following is a full and complete specification, such as will enable those skilled in the art to which it appertains to make and use the same.

The object of this invention is to provide an improved test trap or seal for the sewer-pipes or house-drains of houses whereby the plumbing of the house may be conveniently and safely tested at any time; and with this and other objects in view the invention consists in a test trap or seal of the class specified constructed as hereinafter described and claimed.

In the accompanying drawings, forming part of this specification, in which like numerals of reference designate corresponding parts in the several views, Figure 1 is a side view of my improved test trap or seal, and Fig. 2 a longitudinal section thereof.

In the practice of my invention I provide a test trap or seal of the form shown in the drawings, said test trap or seal being U-shaped in form and provided with opposite side tubular extensions 5 and 6, one of which is designed to form a connection with the drain-pipe of a house and the other with the street-sewer.

In the drawings forming part of this specification I have shown at the right-hand side of the trap or seal a pipe 7, by means of which connection is made with the street-sewer, and this pipe is connected with the trap or seal by a coupling 8 in the usual or any desired manner. I have also shown at 9 a house-drain pipe, and connection is made between this pipe and the trap or seal by means of a coupling 10 in the usual or any desired manner.

The bottom portion 11 of the trap or seal is detachable and is provided at each end with an annular flange or rim 12, whereby it may be secured by means of bolts or in any desired manner with corresponding flanges or rims 13, formed on the opposite side portions 14 of the trap or seal. I also provide at the elbow curves 15 where the tubular extensions 5 and 6 connect therewith, and on the upper side of said elbow-curves upwardly-directed tubular extensions 16, each of which is provided with a detachable cap 17, in which is formed an opening 18, closed by a removable plug 19, and the plugs 19 and the caps 17 are preferably screw-threaded in order to detachably connect said plugs to said caps and said caps with said tubular extensions 16, and the plugs 19 are left-threaded, while the caps 17 are right-threaded.

It is a well-known fact that it is necessary and customary at times to test the plumbing or waste and vent pipes of a house and at the same time to prevent the escape of water therefrom during the test and also the escape of gases from the sewer, and for this purpose I place in or at the point where the bottom portion 11 of the trap or seal is connected with the right-hand side or sewer side of the upper portion of the pipe a strong diaphragm or partition 20, the detachable portion of the trap or seal being removed for this purpose, and when this is done the plug 19 at the left-hand side of the trap or seal may be removed, and the water-supply pipe of the house, which is not shown, is connected with the cap 17 at the left-hand side of the trap, and the plumbing or drain pipes of the house may be fully tested with water, which is introduced from the water-supply pipe through the left-hand cap 17 of the trap or seal in the usual manner without the escape of sewer-gases. After the test has been made the diaphragm 20 may be broken by an instrument inserted through the right-hand tubular extension 16, the plug 19 therein being removed for this purpose, and the test-water will flow back into the sewer. The bottom of the trap is then detached, and the diaphragm is taken out and the bottom reconnected, the connections at the ends thereof being securely packed with annular packings in the usual manner, and the trap will be ready for use. It will also be seen that the points where the detachable portion 11 of the trap or seal is connected with the opposite edges thereof are below the liquids in the seal, and these points are therefore always securely closed when the trap or seal is in operation.

The diaphragm 20 may be made of rubber, lead, leather, or any suitable material capable of being ruptured or destroyed in the manner described.

Having thus fully described my invention, what I claim as new, and desire to secure by Letters Patent, is—

A U-shaped test trap or seal, the sides of which are provided at the top thereof with laterally-directed tubular extensions and with upwardly-directed tubular extensions forming ports or passages which are provided with detachable caps having central openings and means for closing the same, the bottom portion of the trap being detachable and a destructible diaphragm secured in one side of the trap by the securing or attaching of the detachable bottom portion, substantially as shown and described.

In testimony that I claim the foregoing as my invention I have signed my name, in presence of the subscribing witnesses, this 10th day of August, 1901.

CORNELIUS M. BREEN.

Witnesses:
JOHN KEIM, Jr.,
JAMES J. RYAN.